United States Patent
Kaplan et al.

(10) Patent No.: US 9,448,363 B2
(45) Date of Patent: Sep. 20, 2016

(54) DEVICE FOR COMPENSATION OF TIME DISPERSION APPLIED TO THE GENERATION OF ULTRASHORT LIGHT PULSES

(75) Inventors: Daniel Kaplan, Paris (FR); Pierre Tournois, Cagnes S/Mer (FR)

(73) Assignee: FASTLITE, Paris (FR)

(*) Notice: Subject to any disclaimer, the term of this patent is extended or adjusted under 35 U.S.C. 154(b) by 994 days.

(21) Appl. No.: 13/515,184

(22) PCT Filed: Dec. 3, 2010

(86) PCT No.: PCT/FR2010/052604
§ 371 (c)(1),
(2), (4) Date: Oct. 3, 2012

(87) PCT Pub. No.: WO2011/070274
PCT Pub. Date: Jun. 16, 2011

(65) Prior Publication Data
US 2013/0021668 A1    Jan. 24, 2013

(30) Foreign Application Priority Data
Dec. 10, 2009  (FR) .................................. 09 58840

(51) Int. Cl.
G02B 5/18 (2006.01)
G02B 6/293 (2006.01)
H01S 3/00 (2006.01)

(52) U.S. Cl.
CPC .............. G02B 6/29394 (2013.01); G02B 5/18 (2013.01); G02B 5/1814 (2013.01); G02B 6/29392 (2013.01); H01S 3/0057 (2013.01)

(58) Field of Classification Search
CPC .... G02B 5/18; G02B 5/1866; G02B 5/1804; G02B 5/1814; G02B 6/29392; G02B 6/29394; H01S 3/0057

USPC .................................................. 359/558, 576
See application file for complete search history.

(56) References Cited

U.S. PATENT DOCUMENTS

| | | | |
|---|---|---|---|
| 3,719,906 A * | 3/1973 | Tournois ..................... 333/142 |
| 5,602,677 A * | 2/1997 | Tournois ..................... 359/566 |
| 6,320,191 B1 * | 11/2001 | Rudd .................. G02B 6/2931 250/330 |
| 6,636,343 B1 * | 10/2003 | Richman .................. G02F 1/39 359/326 |
| 6,927,914 B2 * | 8/2005 | Ebizuka .................... G01J 3/12 356/305 |
| 7,444,049 B1 * | 10/2008 | Kim et al. ..................... 385/37 |
| 2002/0130245 A1 * | 9/2002 | Fujimoto ........... B23K 26/0057 250/205 |
| 2006/0159396 A1 * | 7/2006 | Tedesco .............. G02B 5/1814 385/37 |
| 2007/0103778 A1 * | 5/2007 | Kaplan .................... G02F 1/33 359/485.02 |
| 2008/0304127 A1 * | 12/2008 | Resan ................ B23K 26/0624 359/238 |
| 2009/0034077 A1 * | 2/2009 | Kane ........................ G01J 3/12 359/566 |

* cited by examiner

*Primary Examiner* — Bumsuk Won
*Assistant Examiner* — William R Alexander
(74) *Attorney, Agent, or Firm* — Browdy and Neimark, P.L.L.C.

(57) ABSTRACT

The invention relates to a device for compensating the temporary scattering applied to the generation of ultra-short light pulses, said device including two identical and parallel optical diffraction gratings RA, RB and two identical prisms PA, PB that are placed inside the above-mentioned optical diffraction gratings RA, RB, given that the above-mentioned optical diffraction gratings RA, RB are volume phase gratings that function, during transmission, on the principle of Bragg diffraction. The outer surfaces FeA, FeB of the above-mentioned prisms PA, PB are parallel to the above-mentioned optical diffraction gratings RA, RB, and the inner surfaces FiA, FiB of the above-mentioned prisms PA, PB are parallel therebetween.

8 Claims, 5 Drawing Sheets

DEVICE FOR COMPENSATION OF TIME DISPERSION APPLIED TO THE GENERATION OF ULTRASHORT LIGHT PULSES

The present invention relates to a device for compensation of time dispersion applied to the generation of ultra short light pulses.

This device notably applies to systems for generating ultra short light pulses requiring compensation of time dispersion of the optical frequencies introduced by the various components of the chain.

Generally, it is known that systems for generating ultra short light pulses with durations of less than or equal to 10 fs have to transmit optical frequency bands of the order of 100 THz, i.e. expressed as an optical wavelength, of the order of 200 nm around the central wavelength of 800 nm. The greatest difficulty encountered in such systems is the compensation of the time dispersion of the optical frequencies in the optical systems.

Dispersion in optical systems is expressed by the variation of the optical phase $\phi$ as a function of the optical angular frequency: $\omega=2\pi\nu$, by means of the following Taylor development:

$$\phi(\omega)=\phi_0+\phi_1(\omega-\omega_0)+\phi_2(\omega-\omega_0)^2/2!+\phi_3(\omega-\omega_0)^3/3!+\ldots$$

$\nu$ being the optical frequency taken around a central frequency $\nu_0$ of angular frequency $\omega_0$.

The group delay time is then given by:

$$t_g(\omega)=t_0+\phi_2(\omega-\omega_0)+\phi_3(\omega-\omega_0)^2/2!+\phi_4(\omega-\omega_0)^3/3!+\ldots$$

The positive dispersion of the $2^{nd}$ order introduced by the materials (variation of the group delay time with optical frequency) may be compensated by the negative dispersion of the $2^{nd}$ order introduced by so-called compressor devices, made for example with a combination of two parallel gratings as described by E. B. Treacy, "Optical Pulse Compression with Diffraction Gratings" IEEE J. Quantum Electron. 5, 9, 454-458, September 1969. However, such a compressor device generally introduces positive dispersion of the third order, which is in the Treacy system added to the dispersion of the materials. These devices are therefore only adequate when the spectral bandwidth is sufficiently narrow so that the effect of the terms of the third order and of higher orders may be considered as negligible. In the opposite case, it is possible to contemplate the use of programmable systems for controlling the spectral phase, capable of processing all the dispersion orders and for example using liquid crystal matrices (cf: A. M. Weiner, "Femtosecond pulse shaping using spatial light modulators", Rev. Sci; Instrum., 71, 5, 1929-1960, May 2000), or acousto-optical diffraction (cf: P. Tournois, "Acousto-optic programmable dispersive filter for adaptive compensation of group delay time dispersion in laser systems" Optics Communications 140, 245-249, 1997).

Another solution consists of making a non-programmable device with which it is possible to obtain a dispersion of the $2^{nd}$ order without any dispersion of the $3^{rd}$ order, or with a sign-adjustable dispersion of the $3^{rd}$ order allowing compensation of the dispersions of various optical systems. A system of this type was proposed as soon as in 1968 (Cf: P. Tournois, "Sur un interféromètre de phase à variation linéaire du temps de retard en fonction de la fréquence" (On a phase interferometer with linear delay time variation versus freaquency) C. R. Acad. Sc. Paris, 269, 455-458, September 1969). It uses a GRISMS pair configuration, i.e. hybrid devices integrating a prism and a transmission grating added onto this prism. This type of system has not been much used in its original form because of the optical power yield limitation, related to the efficiency of the diffraction of the transmission gratings in the configuration used, which is strongly constrained by the requirement of integrating the grating and prism into a single element.

Improvements have been provided since then by using reflection gratings (cf: E. A. Gibson et al. "Efficient reflection grisms for pulse compression and dispersion compensation of femtosecond pulses" Optics Letters, 31, 22, 3363-3365, November 2006; cf: F. Travella et al. "Dispersion management for sub-10 fs, 10 TW optical parametric chirped-pulse amplifier" Optics Letters, 32, 15, 2227-2229, August 2007; cf: J. Zheng, H. Zacharias, "Design considerations for a compact grism stretcher for non-collinear optical parametric chirped-pulse amplification" Appl. Phys. B).

Nevertheless, their use leads to a complicated optical configuration and the diffraction angles remain still far from the Littrow condition which ensures very good diffraction efficiency. Moreover, their spectral band of use is perhaps limited by considerations of the geometry of optical beams.

The object of the invention is a device for the compensation of time dispersion applied to the generation of ultra short light pulses; for this purpose it proposes the use of two identical and parallel optical diffraction gratings and of two identical prisms placed inside the gratings, being aware that the gratings are volume phase gratings operated in transmission on the principle of Bragg's diffraction, the outer faces of the prisms being parallel to the gratings and the inner faces of the prisms being parallel with each other.

Thus, the device according to the invention is based on combinations of transmission gratings and of prisms which are not necessarily integrated; this provides greater flexibility in the selection of the parameters for targeting optimum performances in terms of spectral band and of diffraction efficiency.

Moreover, these gratings are volume phase holographic gratings (cf.: S. Barden et al. "Volume-Phase Holographic Gratings and the Efficiency of Three Simple Volume-Phase Holographic Gratings" PASP, 112, 809-820, June 2000) or gratings with slits machined in silica (Cf: K. Buchwald "Fused Silica Transmission Gratings", Ibsen Photonics).

Advantageously, the device according to the invention may be applied to the making of ultra short pulse amplifiers using the extension/compression principle. In these systems, in order to circumvent the limitations of instantaneous optical power in amplifiers, the light pulse is first extended in time by a device with dispersion of the second order with a given sigma, and then amplified and finally recompressed by a device with dispersion of the second order with a sign opposite to the first.

Moreover, another application may be contemplated relating to programmable dispersion devices based on acousto-optical diffraction. These devices are made in a material, such as Paratellurite, for which the specific dispersion is added to the programmed dispersion produced by acousto-optical interaction. A junction of a device according to the invention will allow total or partial compensation of this specific dispersion, which allows extension of the use of the device to greater bandwidths.

An embodiment of the method according to the invention will be described hereafter, as a non-limiting example with reference to the appended drawings wherein.

Figure 1:
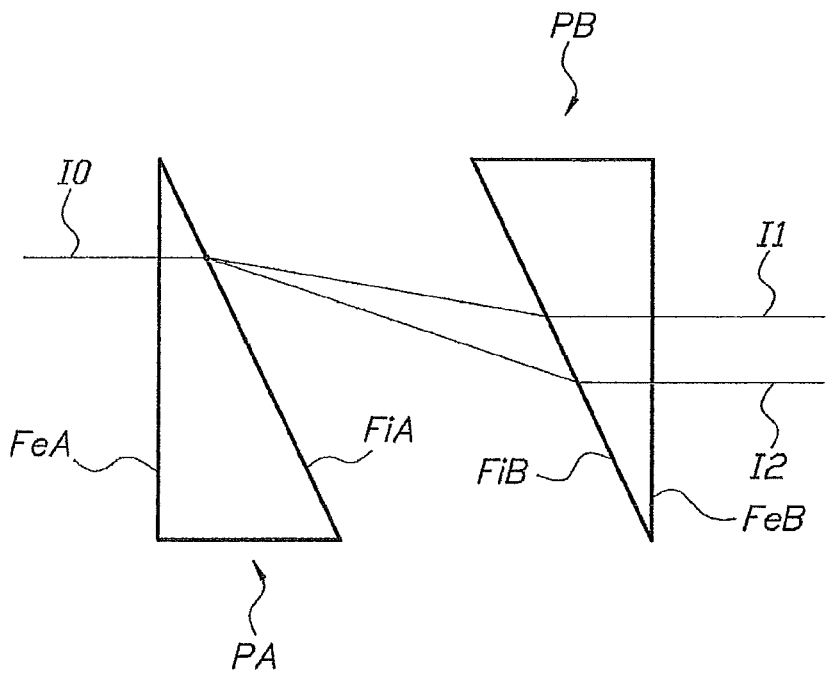
FIG. 1 is a schematic illustration of a configuration of two prisms in a so-called head to tail geometry.

In the example illustrated in FIG. 1, the schematic illustration of a configuration of two prisms PA, PB, with a so-called head to tail geometry shows that each face of one of the prisms is parallel to the corresponding face of the other prism; thus, the inner face Fia of the prism PA is parallel to the inner face FIB of the prism PB; also, the outer face FeA of the prism PA is parallel to the outer face FeB of the prism PB.

If an optical beam $I_0$ penetrates perpendicularly to the outer face FeA of the prism PA, it emerges through the inner face FiA of the prism PA with an angle depending on the wavelength of the beam $I_0$; this beam then penetrates through the inner face FiB of the prism PB, and then emerges according to $I_1$, $I_2$, through the outer face FeB of the prism PB along a direction parallel to the direction of the optical beam $I_0$. The optical path covered by the optical beam depends on the wavelength, thus, the two optical beams $I_1$, $I_2$ respectively correspond to the optical paths $t_1$, $t_2$ covered by the wavelengths, $\lambda_1$, $\lambda_2$ respectively. This leads to negative dispersion, the optical path increasing with the wavelength. Such a configuration is known in the state of the art as being a compressor with prisms. The calculation of the optical paths leads to a negative dispersion of the $3^{rd}$ order, which cannot be cancelled through selecting geometrical parameters.

Figure 2:
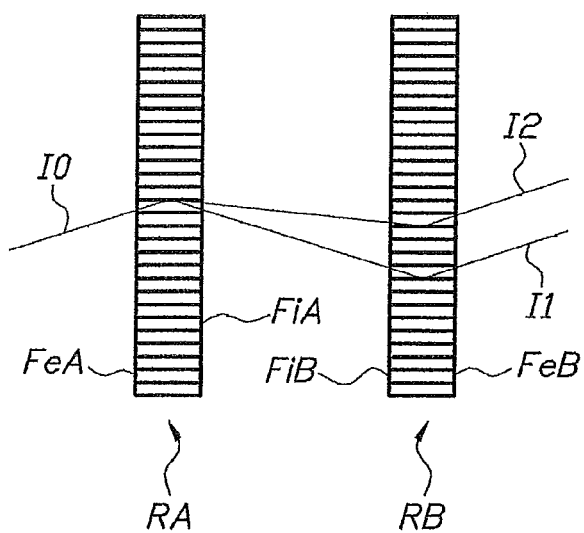
FIG. 2 is a schematic illustration of a configuration of two parallel gratings operating in transmission.

In the example illustrated in FIG. 2, the schematic illustration of a configuration of two parallel gratings operating in transmission show that the outer and inner faces of the gratings RA, RB are parallel; thus, the inner face FiA of the grating RA is parallel to the inner face FiB of the grating RB; also, the outer face FeA of the grating RA is parallel to the outer face FeB of the grating RB.

If an optical beam $I_0$ penetrates through the outer face FeA of the grating RA, it emerges through the inner face FiA of the grating RA with an angle depending on the wavelength of the beam $I_0$; this beam then penetrates through the inner face FiB of the grating RB, and then emerges according to $I_1$, $I_2$, through the outer face FeB of the grating RB along a direction parallel to the direction of the optical beam $I_0$. The optical path covered by the optical beam depends on the wavelength: thus, both optical beams $I_1$, $I_2$ respectively correspond to the optical paths $t_1$, $t_2$ covered by the wavelengths $\lambda_1$, $\lambda_2$ respectively. This leads to a negative dispersion of the 2nd order, and to an intrinsic positive dispersion of the 3rd order. Such a configuration is known in the state of the art as being a compressor with gratings.

Transmission gratings, described earlier, are essentially of two types: so-called surface diffraction gratings and so-called volume diffraction gratings.

Figure 3:
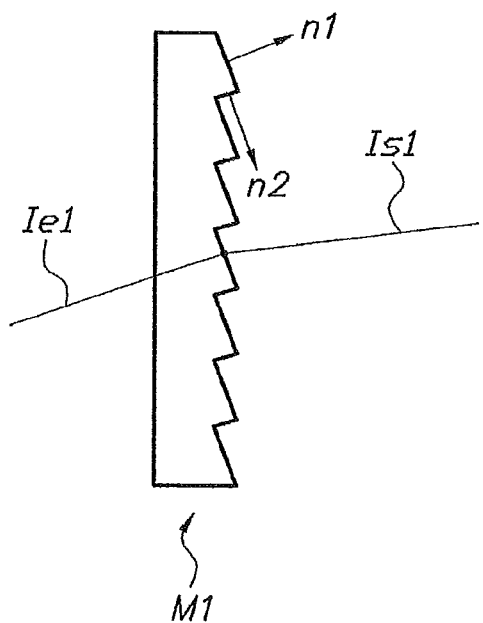
FIG. 3 is a schematic illustration of a grating using surface diffraction.

In the example illustrated in FIG. 3, the schematic illustration of a grating using surface diffraction shows a transparent material M1 comprising a planar input face Fe1 and an output face Fs1 including a succession of pairs of two facets, the normals of which are respectively n1, n2; each pair of facets thus comprises two facets of different surface area, the aforesaid normals n1, n2, being of different direction; this type of grating known in the state of the art is said to be a grating with facets.

If an optical beam Ie1 obliquely penetrates on the entry face Fe1, it emerges through the output face Fs1 with an angle depending on the wavelength of the beam Ie1; diffraction efficiency is increased if for a given incident optical beam Ie1, the diffractive beam Is1 is parallel to the normal of the facet having the largest surface area. Nevertheless, if this condition is met, a significant loss of energy occurs corresponding to the diffraction orders which do not meet this condition.

Figure 4:
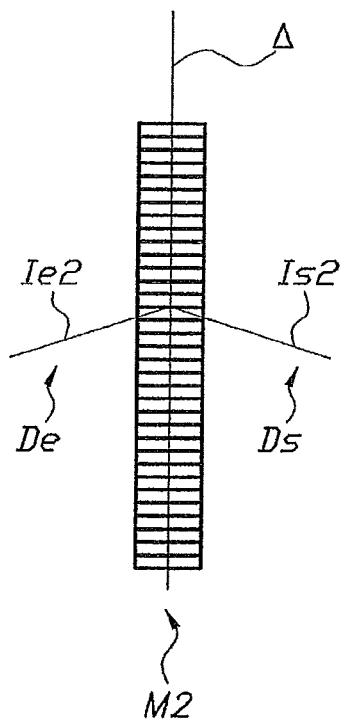
FIG. 4 is a schematic illustration of a grating using volume diffraction.

In the example illustrated in FIG. 4, the schematic illustration of a grating using volume diffraction shows a transparent material M2 with a thickness H comprising a planar input face Fe2 and a planar output face Fs2, both faces Fe2, Fs2 being parallel.

The transparent material M2 comprises a variation in the optical index period along the direction of an axis A parallel to both faces Fe2, Fs2.

For a sufficiently high ratio between the thickness H and the optical wavelength, Bragg diffraction may be observed, i.e. the transmitted energy is mainly contained in an output beam Is2 with a direction Ds approximately symmetrical relatively to the axis $\Delta$ of a direction De of the input beam Ie2; the other diffraction orders are much weaker; nevertheless, the diffraction efficiencies are higher than for gratings with facets.

Thus, for a given central wavelength, the angle of incidence is set by Bragg's condition for diffraction gratings; a compromise is therefore sought between the improvement in the efficiency and the reduction in the spectral band when the thickness h is increased.

Figure 5:
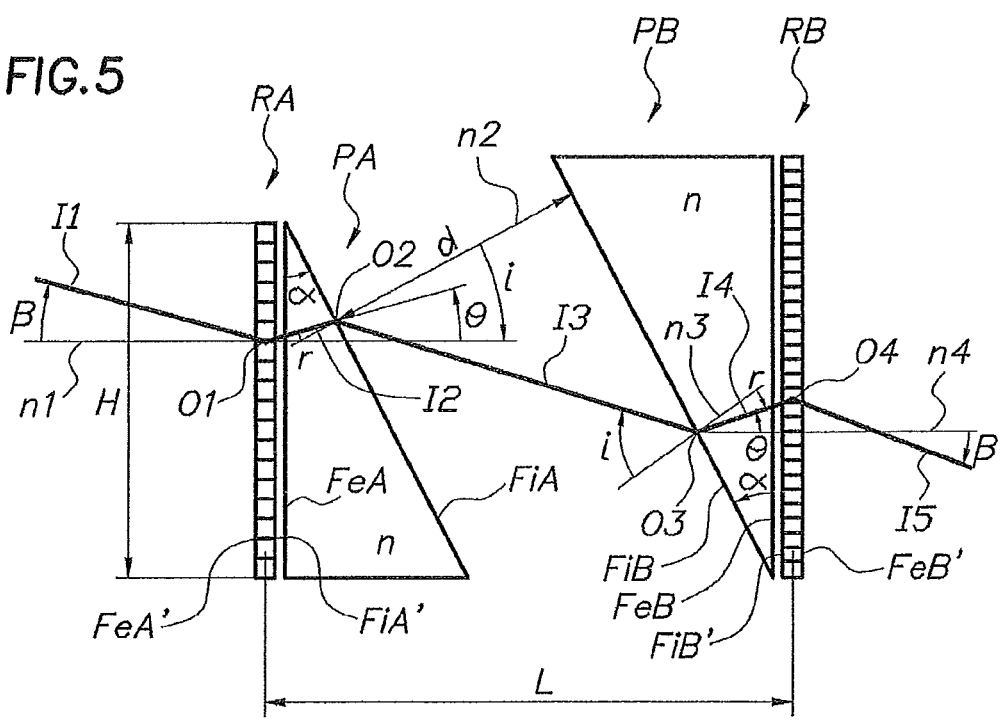
FIG. 5 is a schematic illustration of a structure of the device according to the invention for the compensation of time dispersion applied to the generation of ultra short light pulses.

In the example illustrated in FIG. 5, the schematic illustration of a structure of the device according to the invention for the compensation of time dispersion applied to the generation of ultra short light pulses shows a configuration of two prisms PA, PB, in a so-called head to tail geometry comprising in the vicinity of their outer faces, FeA, FeB respectively, two volume diffraction gratings, RA close to the outer face FeA of the prism PA, and RB close to the outer face FeB of the prism PB, respectively. The outer faces, FeA, FeB, of the prisms PA, PB, respectively, are parallel to the internal faces FiA', FiB', of gratings RA, RB respectively; the external faces FeA', FeB', of the gratings RA, RB respectively, are parallel to the internal faces FiA', FiB' of said gratings RA, RB.

The aforesaid internal faces FiA', FiB', of the gratings RA, RB, respectively are sufficiently close to the aforesaid external faces FeA, FeB of the prisms PA, PB, respectively so that the prism PA is considered as being an integral part of the grating RA, and that the prism PB is considered as being an integral part of the grating RB.

Both gratings RA, RB are identical and comprise $\sigma$ lines/mm; they are distant from each other by a length L.

Both prisms PA, PB are identical, of index n, of apex angle $\alpha$ and the distance between their apices, reckoned parallel to the surface of the gratings, is H.

The distance between both internal faces FiA, FiB, of the prisms PA, PB, is respectively defined by d.

An incident optical beam $I_1$ penetrates into the grating RA in a point $O_1$ under an incidence $\beta$ relatively to the normal $n_1$ to the grating RA.

The optical index n of the prisms PA, PB, is selected so that the 0 order, which is not diffracted, is totally reflected by the inclined face FiA of the prism PA. This condition is written as:

$$n \cdot \sin [\alpha + \arcsin(\sin \beta/n)] > 1$$

Order 1 is diffracted under a positive angle $\theta$ towards the apex of the prism PA, illustrated by the optical beam $I_2$, which is refracted, illustrated by the beam $I_3$, through the inclined face PiA of the prism PA in a point $O_2$, under an angle i, such that:

$$\sin i = n \cdot \sin r,$$

the angle $r=(\theta-\alpha)$ being the angle formed by the diffracted beam $I_3$ with the normal $n_2$ to the face PiA.

The distance d between both internal faces FiA, FiB, of the prisms PA, PB, respectively is:

$$d = (L \cdot \cos \alpha - H \cdot \sin \alpha)$$

The beam $I_3$ travels in air over a distance d/cos i, in order to end up at point $O_3$ on the internal face FiB of the prism PB, and is then refracted by the prism PB, illustrated by the beam $I_4$, under the angle r, and then ends up in a point $O_4$ in the grating RB under the angle $\theta$, so as to be diffracted, illustrated by the beam $I_5$, parallel to the incident beam $I_1$, under the angle $\beta$ relatively to the normal $n_4$ to the grating RB.

The speed of light in vacuo being c and N being the optical group index of the prisms, the group delay time $t_g$ introduced by the device between an incoming wave plane passing through the apex of the first prism PA and an outgoing wave plane passing through the apex of the second prism PB is given by:

$$c \cdot t_g = d/\cos i + [N(\tan \theta - \tan r) + \sin \beta/\cos \theta] \cdot [L \sin \theta + H \cos \theta + d \sin(i-r)/\cos i]$$

The angle of incidence $\beta$ and the diffraction angle $\theta$ are related through the diffraction formula of gratings:

$$\sin \beta + n \sin \theta = 0.3 \, \sigma/\nu,$$

$\nu$ being the optical frequency expressed in THz.

In order to optimize the efficiency of the gratings in the contemplated frequency band, the angle $\beta$ is such that:

$$\sin \beta = n \sin \theta_0 = 0.15 \sigma/\nu_0,$$

which is Bragg's condition for this type of grating, $\theta_0$ being the diffraction angle of order 1, in the prisms, for the central optical wavelength $\lambda_0$ of optical frequency $\nu_0$.

Taking into account this optimization, the following system of equations:

$$n \cdot \sin(\alpha+\theta_0) > 1$$

$$\sin \theta = 0.3\sigma(1/\nu - \tfrac{1}{2}\nu_0)/n$$

$$r = \theta - \alpha$$

$$\sin i = n \cdot \sin r$$

$$d = L(\cos \alpha - h \sin \alpha)$$

associated with the expression of the group delay time $c \cdot t_g$, allows the delay time $t_g$ to be plotted versus $\nu$ for a glass of given indexes n and N and the selected parameters: $\alpha$, $\sigma$, $\nu_0$, L and h.

As a first example of a very wide band compensation device according to the invention, it is sought to compensate for the time dispersion of a $TeO_2$ crystal with a length of 45 mm which forms the acousto-optical head of a AOPDF (Acousto-Optical Programmable Dispersive Filter) filter in a band of 250 nm around the optical frequency $\nu_0$ of 375 THz ($\lambda_0$=0.8 μm).

For this, a Grisms pair is selected, for which the gratings have $\sigma$=315 lines/mm and glass prisms SF 57 with an apex angle $\alpha$=33.5°.

Under these conditions, $\beta$ and $\theta_0$ respectively have the values 7.24° and 3.96°.

Figure 6:
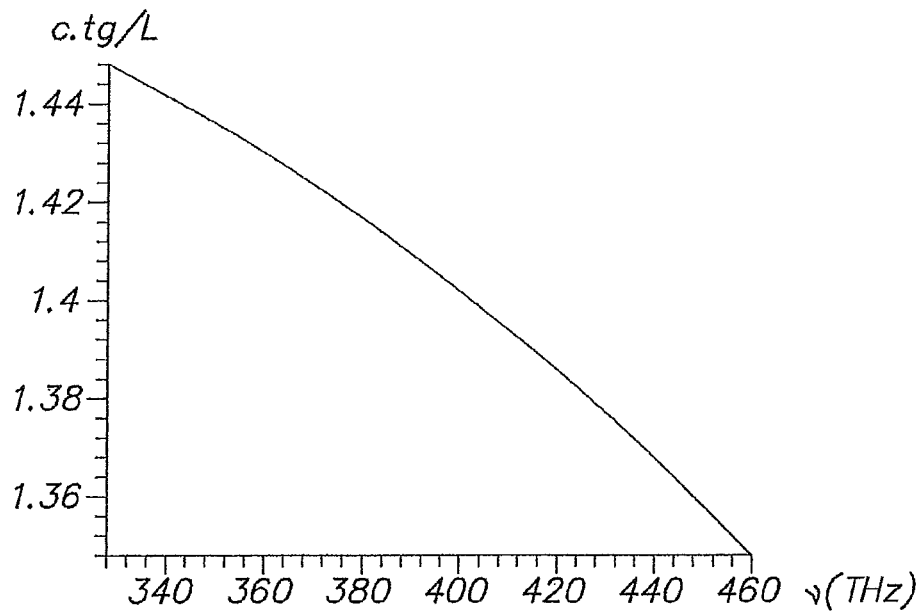
FIG. 6 is a first schematic illustration of the variation of the normalized delay time versus optical frequency.

In the example illustrated in FIG. 6, the curve of the variation of the normalized delay time $c \cdot t_g/L$ versus the optical frequency $\nu$, comprised between 330 and 460 THz, for h=H/L=0.85, i.e. between the wavelengths $\lambda$=650 nm and $\lambda$=900 nm (i.e. 250 nm around 0.8 Ξm), shows a monotonous change in the normalized delay time between 1.45 and 1.35 for optical frequencies of 330 THz and 460 THz respectively.

Figure 7:
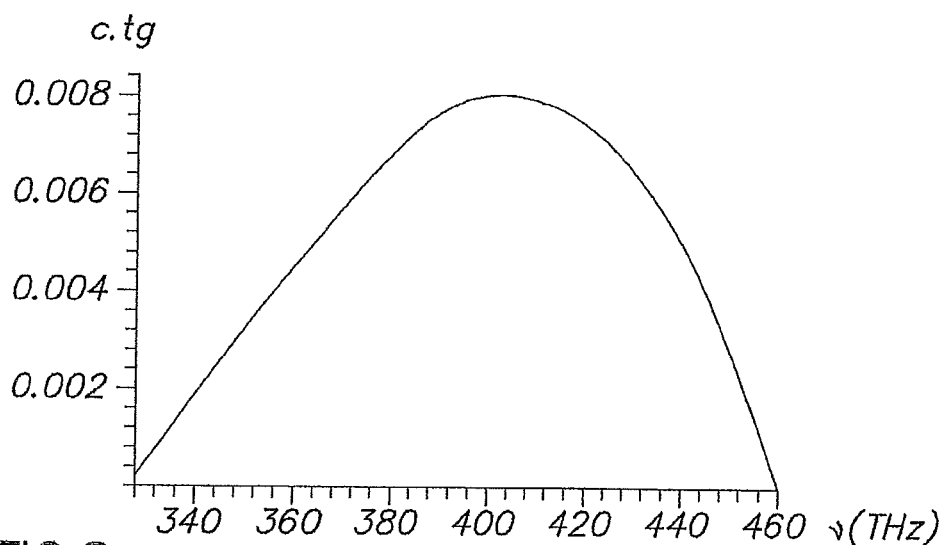
FIG. 7 is a schematic illustration of the variation of the delay time according to FIG. 6 from which a linear function has been subtracted.

In the example illustrated in FIG. 7, a purely linear function is subtracted from the delay time according to FIG. 6. The resulting curve shows that the residual dispersion of the 3rd order is negative.

Figure 8:
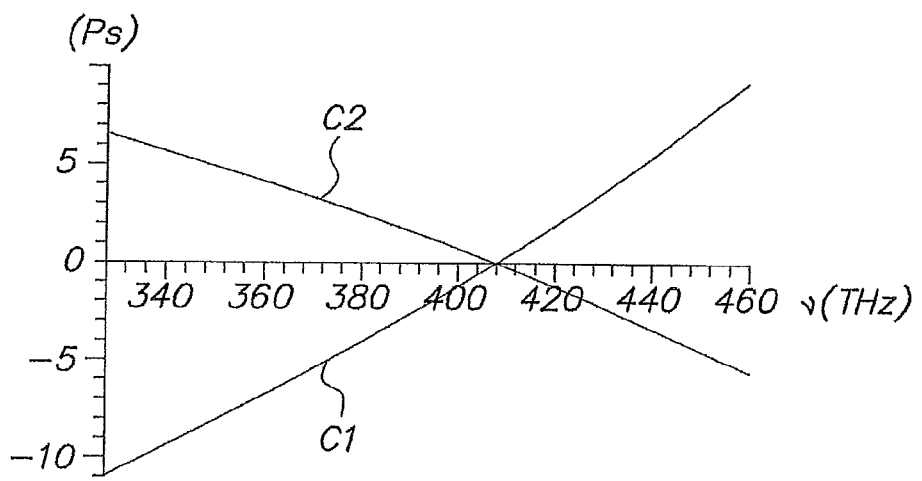
FIG. 8 is a first schematic illustration of dispersion curves of a Paratellurite crystal and of the device according to the invention.

In the example illustrated in FIG. 8, the schematic illustration of the dispersion curves of a Paratellurite crystal and of a device according to the invention shows two curves, $C_1$, $C_2$, respectively the positive dispersion of a Paratellurite crystal with a length of 45 mm, and the negative dispersion of a device according to the invention for which the distance between the gratings RA, RB is L=42 mm, versus the optical frequency $\nu$, comprised between 330 and 460 THz.

Figure 9:
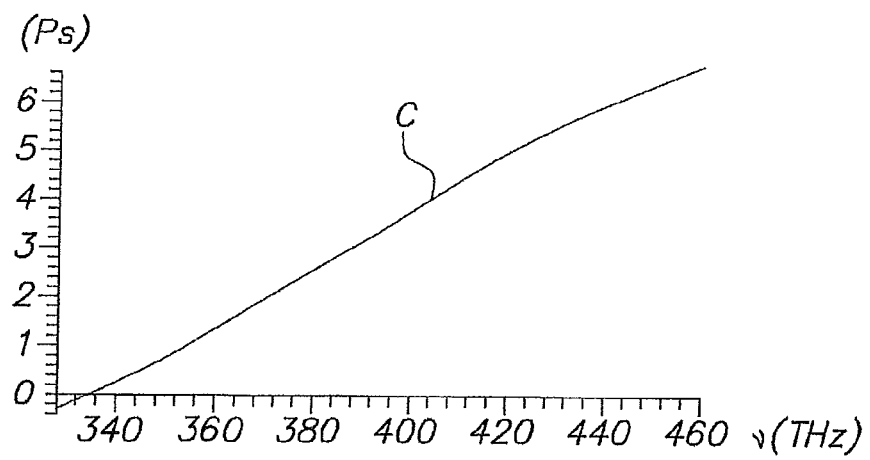
FIG. 9 is a first schematic illustration of the addition of the dispersion curve of a Paratellurite crystal and of that of a device according to the invention.

In the example illustrated in FIG. 9, the schematic illustration of the addition of the dispersion curve of a Paratellurite crystal and that of a device according to the invention shows, within a constant delay time, a curve C as a function of the optical frequency $\nu$, comprised between 330 and 460 THz, for a Paratellurite crystal with a length of 45 mm and a distance of 42 mm between the gratings RA, RB.

The residual quasi-linear delay time of 6 ps, depending on the optical frequency, i.e. half the 12 ps programming capacity of the AOPDF device, is intended to be compensated by programming the acousto-optical diffraction in order to optimize the efficiency of this diffraction.

Thus, the duration of the very wide band light pulse may be controlled between less than 10 fs and 6 ps.

As a second exemplary device for time dispersion compensation according to the invention, it is sought to compensate for the time dispersion of 80 ps introduced by a silica fiber drawing device with a length of 7.5 mm in a band of 100 nm around $\lambda_0$=0.8 μm. For this purpose a Grisms pair for which the gratings have $\sigma$=1,200 lines/mm and glass prisms SF 57 with an apex angle $\alpha$=42.5° is selected. Under these conditions, $\beta$ and $\theta_0$ have the values 28.7° and 15.26° respectively.

Figure 10:
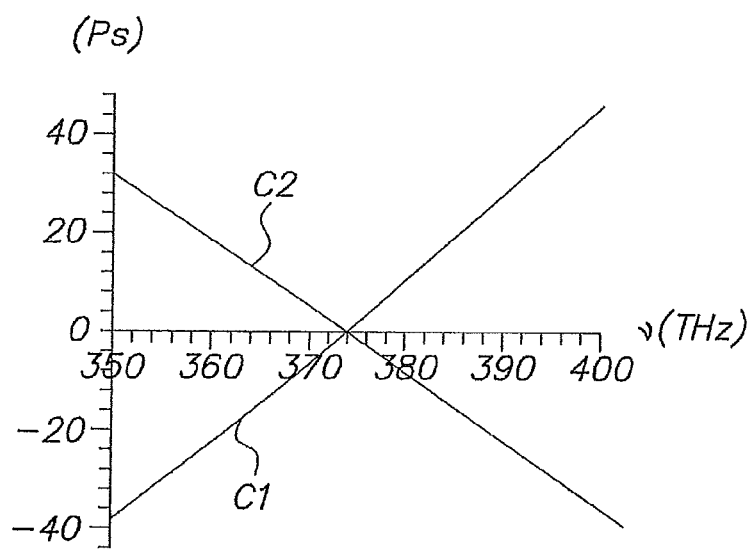
FIG. 10 is a second schematic illustration of the dispersion curves of a silica fiber drawing device and of the device according to the invention.

In the example illustrated in FIG. 10, the illustration of the dispersion curves of a 7.5 m silica fiber and of a device according to the invention, with a distance L=14 cm between the gratings, shows two curves C1, C2, respectively the positive dispersion of the fiber and the negative dispersion of the device according to the invention versus the optical frequency ν, comprised between 350 THz and 400 THz.

Figure 11:
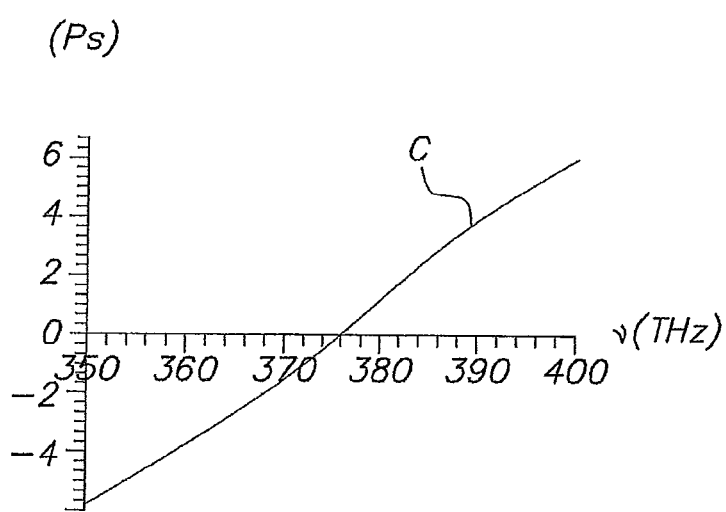
FIG. 11 is a second schematic illustration of the addition of the dispersion curve of a silica fiber drawing device and of that of a device according to the invention.

In the example illustrated in FIG. 11, the schematic illustration of the addition of the dispersion curves of the fiber and of the device according to the invention shows, within a constant delay time, a curve C versus the optical frequency ν, comprised between 350 THz and 400 THz, for a silica fiber with a length of 7.5 m and a distance of 42 mm between the gratings RA, RB.

The quasi-linear residual delay time of 12 ps, depending on the optical frequency, is intended to be compensated by programming the acousto-optical diffraction in order to optimize the efficiency of this diffraction.

Thus, a light pulse of less than 20 fs and of great energy, may be generated by lasers operating on the extension/compression principle.

In the case of the compressors described earlier, the side displacement of the aforesaid optical paths $t_1$, $t_2$, covered by the wavelength $\lambda_1$, $\lambda_2$, respectively corresponding to the aforesaid optical beams $I_1$, $I_2$, may not be compatible with the intended use of the aforesaid optical beam $I_0$.

Advantageously, in the state of the art, by reflexion on an adequate device, inverse return through the structure of the device according to the invention would give the possibility of doubling the dispersion effects and again finding the initial geometry of the optical beam.

Advantageously, a second device according to the invention, oriented by 180° relatively to the first, will give the possibility of doubling the dispersion effects and again finding the initial geometry of the optical beam.

Advantageously, the integration of a grating and of a prism in a GRISM device will not be necessary but on the contrary will allow their use as separate elements and consequently introduction of flexibility in the design elements.

The invention claimed is:

1. A device for the compensation of the time dispersion applied to the generation of ultra short light pulses comprising two identical and parallel optical diffraction gratings (RA, RB) and two prisms made of the same optical index and with the same apex angles (PA, PB) placed inside the aforesaid optical diffraction gratings (RA, RB), characterized in that the aforesaid optical diffraction gratings (RA, RB) are volume phase gratings operating in transmission on the Bragg diffraction principle, the outer faces (FeA, FeB) of the aforesaid prisms (PA, PB) being parallel to the aforesaid optical diffraction gratings (RA, RB), and the inner faces (FiA, FiB) of the aforesaid prisms (PA, PB) being parallel with each other.

2. A combination device comprising first and second devices according to claim 1, with light traversing first device then second device, second device geometry corresponding to first device geometry rotated by 180°.

3. A system comprising a device according to claim 1 and an additional optical element, where said device is used to compensate or eliminate unwanted dispersion characteristics of said optical elements.

4. A system comprising a device according to claim 2 and an additional optical element, where said device is used to compensate or eliminate unwanted dispersion characteristics of said optical elements.

5. A system according to claim 3 where said optical elements are composed of an acousto-optic device.

6. A system according to claim 4 where said optical elements are composed of an acousto-optic device.

7. A system according to claim 3 where said optical elements are the elements of an ultrafast laser system.

8. A system according to claim 4 where said optical elements are the elements of an ultrafast laser system.

* * * * *